United States Patent
Heer et al.

(10) Patent No.: US 10,346,421 B1
(45) Date of Patent: Jul. 9, 2019

(54) DATA PROFILING OF LARGE DATASETS

(71) Applicant: Trifacta Inc., San Francisco, CA (US)

(72) Inventors: Jeffrey Heer, Seattle, WA (US); Lars Grammel, Berlin (DE); Sean Philip Kandel, San Francisco, CA (US); Philip John Vander Broek, San Francisco, CA (US)

(73) Assignee: Trifacta Inc., San Francisco, CA (US)

(*) Notice: Subject to any disclaimer, the term of this patent is extended or adjusted under 35 U.S.C. 154(b) by 204 days.

(21) Appl. No.: 15/294,537

(22) Filed: Oct. 14, 2016

Related U.S. Application Data

(60) Provisional application No. 62/242,713, filed on Oct. 16, 2015.

(51) Int. Cl.
G06F 7/00 (2006.01)
G06F 17/30 (2006.01)
G06F 16/26 (2019.01)
G06F 16/25 (2019.01)

(52) U.S. Cl.
CPC ............ G06F 16/26 (2019.01); G06F 16/252 (2019.01)

(58) Field of Classification Search
CPC .......... G06F 17/30572; G06F 17/3056; G06F 17/30958; G06F 17/30516
USPC ........................................ 707/722, 736, 737
See application file for complete search history.

(56) References Cited

U.S. PATENT DOCUMENTS

| | | | |
|---|---|---|---|
| 2010/0071005 A1* | 3/2010 | Kusunoki | G06F 17/30781 725/46 |
| 2015/0379303 A1* | 12/2015 | LaFever | G06F 21/6218 726/28 |
| 2017/0004256 A1* | 1/2017 | Miyashita | G06F 19/28 |
| 2017/0070524 A1* | 3/2017 | Bailey | H04L 63/1416 |

OTHER PUBLICATIONS

Liu, Z. et al., "imMens: Real-Time Visual Querying of Big Data," Eurographics Conference on Visualization (EuroVis) 2013, Computer Graphics Forum, 2013, 10 pages, vol. 32, No. 3.
Kandel, S. et al., "Profiler: Integrated Statistical Analysis and Visualization for Data Quality Assessment," AVI'12, ACM, May 21-25, 2012, 8 pages.

\* cited by examiner

*Primary Examiner* — Md I Uddin
(74) *Attorney, Agent, or Firm* — Fenwick & West LLP

(57) ABSTRACT

A system provides data profile information describing attributes of a dataset. The system determines relative frequency of occurrences of attribute values with respect to a set of bins from a histogram of another attribute. The system presents a user interface that presents statistical information describing attributes of a dataset based on the relative frequency of occurrences of attribute values. The system generates a transformation script based on the user interactions for transforming records of the dataset. The transformation script is configured to preprocess data of the dataset for further analysis.

19 Claims, 13 Drawing Sheets

Fig. 4

DATA PROFILING OF LARGE DATASETS

CROSS REFERENCES TO RELATED APPLICATIONS

This application claims the benefit of U.S. Provisional Application No. 62/242,713, filed on Oct. 16, 2015, which is incorporated by reference in its entirety.

BACKGROUND

The disclosure relates in general to preprocessing data for analysis by big data analysis systems such as parallel and distributed systems and more specifically to analyzing data for purposes of generating a data profile of datasets.

Big data analysis systems process the huge amount of data generated by organizations. These big data analysis systems typically use parallel and distributed architectures to process the data. The raw data that is analyzed may be data representing transactions performed, data received from external systems, data generated by sensors, data entered manually by users, and so on. This data often includes structured data as well as unstructured and/or semi-structured data stored in a wide variety of formats. Big data analysis systems typically need the data to be available in a specific format to be able to analyze that data and exploit the parallelism inherent in the data.

However the quality of raw data received for analysis by a big data analysis system is often poor. In other words, raw data generated by the disparate sources is not in a format that can be readily processed by big data systems. Such raw data often contains missing fields, data anomalies, erroneous values, duplicate values, nested structures that cannot be processed by the big data analysis system, data that does not conform to certain type constraints, and so on. The amount of data that is in a proper format that can be processed by big data systems is often a fraction of the overall data available. The quality of results obtained by analyzing the data is limited by the amount of data that the big data system can process.

The amount of data that can be processed by the big data systems can be improved by preprocessing the raw data by transforming the data to a form that can be efficiently processed by the big data systems. Preprocessing of data requires analyzing the data and performing transformations to the data to bring the data to a desired form. Analyzing raw data is often a tedious and time consuming process that requires experts who can analyze the data and developers who can write the scripts. As a result, preprocessing data in preparation for analysis is often an expensive process.

BRIEF DESCRIPTION OF DRAWINGS

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The disclosed embodiments have other advantages and features which will be more readily apparent from the detailed description, the appended claims, and the accompanying figures (or drawings). A brief introduction of the figures is below.

FIG. 4 shows a screenshot of a user interface illustrating various interactions with the data preprocessing system, according to an embodiment.

The steps of processes illustrated as flowcharts described herein can be executed in an order different from that described herein. Furthermore, actions described as being executed by certain software modules may be executed by other software modules than those indicated herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Embodiments of the invention configure user interfaces for receiving user interactions for performing visual analysis of large datasets. A data preprocessing system processes attributes of a dataset and visually represents statistical information describing the dataset. For example, histograms that visually represent distribution of various attributes of the dataset are presented via a user interface. The data preprocessing system receives user interactions with the histograms. In response to the user interactions with the histograms, the data preprocessing system identifies attributes of the dataset that are related to a particular attribute. For example, the system receives from a user interface, a subset of values of an attribute and determines the distribution of values of other attributes that are related to the specified subset. The data preprocessing system makes recommendations of transformations based on the selected subset of data. The system stores a sequence of transformations, for example, as a transformation script for preprocessing data for providing to a big data analysis system.

System Environment for Big Data Analysis

Figure 1:
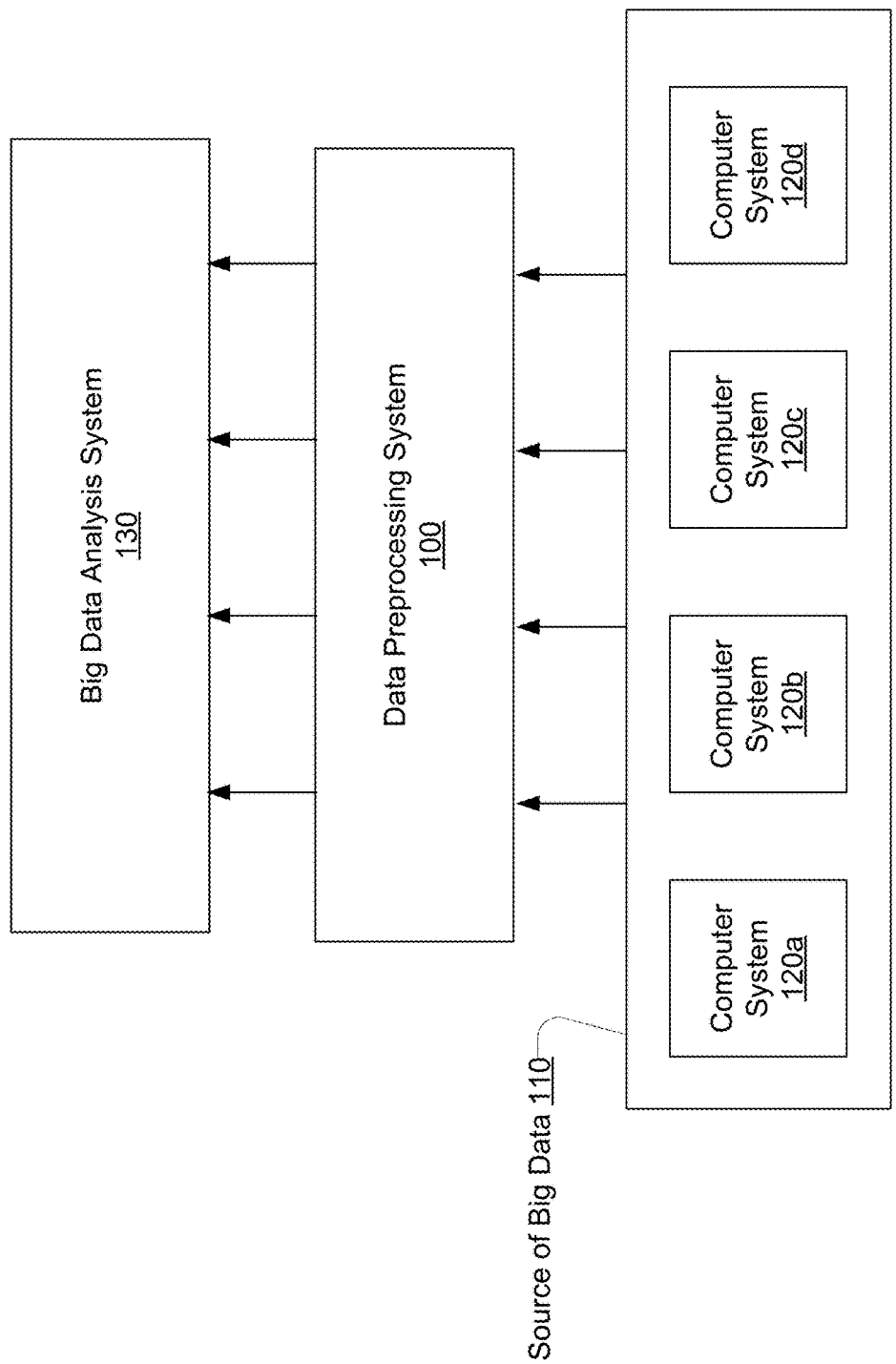
FIG. 1 shows the overall system environment for performing big data analysis, according to an embodiment.

FIG. 1 shows the overall system environment for performing big data analysis, according to an embodiment. FIG. 1 shows various systems involved in generation of and processing of big data. The overall system environment includes a source of data 110, a data preprocessing system 100, and a data analysis system 130. In other embodiments, more or less systems/components than those indicated in FIG. 1 may be used. For example, the various systems shown in FIG. 1 may interact via a network (not shown in FIG. 1). Furthermore, there may be more or less instances of each system shown in FIG. 1, for example, there may be multiple instances of big data analysis systems 130. The big data analysis system may also be referred to herein as a data analysis system, analysis system, or a system.

FIG. 1 and the other figures use like reference numerals to identify like elements. A letter after a reference numeral, such as "120*a*," indicates that the text refers specifically to the element having that particular reference numeral. A reference numeral in the text without a following letter, such as "120," refers to any or all of the elements in the figures bearing that reference numeral (e.g. "120" in the text refers to reference numerals "120*a*" and/or "120*b*" in the figures).

The source of big data 110 may be an organization or enterprise that uses multiple computer systems 120 for processing data of the organization or enterprise. Each computer system 120 performs activities that result in generation of data. For example, a computer system 120 may perform transactions and generate logs based on the transactions. Another computer system (or systems) may process and generate data based social interactions by logging actions performed by users. Another computer system 120 may process, generate, and store images. The data available in the computer systems 120 is analyzed by the big data analysis system 130.

Since the amount of data generated by such sources of data can be large and unstructured, conventional analysis tools, for example, reporting systems based on database queries are often not capable of processing this data. As a result, big data analysis systems 130 are used that are often parallel and distributed systems and are capable of processing unstructured data. Big data analysis systems 130 typically analyze big data to perform data mining operations, predictive analysis, forecasting, text mining, and so on. For example, large amount of data representing sales, interactions between users, and so on may be used to derive sales trends among different types of consumers, to predict success of different sales or marketing campaigns, and so on.

The raw data produced by source of big data 110 often includes records that are not in a form in which the big data analysis system 130 can process the data. The big data analysis system 130 typically requires the input data to conform to certain formatting rules. The formatting rules may be specific to certain columns of a dataset or may apply to multiple columns. A formatting rule may specify various constrains applicable to a particular type of data. For example, a column storing address may have several constraints, for example, the values in a state field must be a valid state (given a country), the zip code must be from a valid set of zip codes and also must conform to the format of the country, and so on.

The sources of big data 110 often produce data in formats that are not anticipated by the big data analysis system 130. Following is an example illustrating non-conformance of raw data with respect the formatting rules of a big data analysis system 130. The big data analysis system 130 may expect a particular field to be numeric whereas various data records obtained from the source of big data 110 may include alphabetic characters or even special characters. Similarly, the big data analysis system 130 may expect a field to store URLs (uniform resource locators) and not all values of the field produced by the source of big data 110 may include URLs in a proper format. As another example, the big data analysis system 130 may assume one or more different formats of addresses for an address field and the raw data may include addresses that do not conform to these formats of addresses.

The data preprocessing system 100 performs processing of the raw data obtained from the sources of big data 110 to transform the raw data into a format that is suitable for consumption by the big data analysis system 130 (i.e., a format that conforms to the formatting rules of the big data analysis system 130.) For example, if the raw data includes URLs that do not conform to the standard URL format, the data preprocessing system 100 transforms the data to generate URL in a format that can be processed by the big data analysis systems 130. For example, assume that several URL fields include values of the form "http;//xyz.com" where the prefix "http" is followed by ";" instead of ":". This may happen, for example, if the URLs are obtained from logs based on URL values manually entered by users (that include commonly occurring typos.)

The step of preprocessing the data is also referred to as cleansing the data by modifying data that does not satisfy various formatting criteria that determine whether the data can be processed by the big data analysis system 130. For example, end users often make mistakes while entering URLs, thereby introducing incorrect URL values in the data. However, the data entered by the user is still valuable information since the system can derive information based on the fact that the user intended to enter a specific URL. The intended URL may be obtained by performing a transformation of the incorrect URL field that replaces ";" by ":". The data preprocessing system 100 may include a large number of such transform operations that pre-process the raw data produced by sources of big data 110.

The transform operations may be provided by experts that review the data produced by the big data source 110. The data preprocessing system 100 may include transform operations based on commonly occurring patterns of bad data typically generated by sources of big data 110. Accordingly, the data preprocessing system 100 takes raw data generated by sources of big data 110 and prepares (or preprocesses) the data so as to transform the raw data for consumption by big data analysis system 130.

The data preprocessing system 100 may not be able to transform all available raw data to a format that conforms to the formatting rules of the big data analysis system. For example, certain fields may store values from which no meaningful information may be deciphered. However, even if the data preprocessing system 100 is able to preprocess a significant portion of raw data, the amount of information available to the big data analysis system 130 increases by certain amount.

As an example, assume that the big data analysis system is able to process 50% of the raw data generated by the source of big data without any preprocessing. The remaining 50% of the raw data is assumed to be bad raw data that does not conform to the formatting rules of the big data analysis system 100. Assume that the data preprocessing system 100 is able to transform 80% of the bad raw data to a form that can be processed by the big data analysis system 130 but is unable to decipher the remaining 20% of the bad raw data. In this situation, even though the data preprocessing system 100 is unable to decipher 20% of the bad raw data, the data preprocessing system 100 helped increase the amount of data that can be processed by the big data analysis system 130 to 90% of the original raw data. As a result, the big data analysis system 130 is likely to be able to generate more accurate information or derive new information based on the additional data that the big data analysis system 130 is able to process.

Embodiments receive user interactions with datasets and build transformation scripts that are used by the data preprocessing system 100 to preprocess data received from data sources 110. The data preprocessing system 100 presents users with visual representations of statistical information describing attributes of the dataset. The data preprocessing system 100 receives user interactions via the visual representations of the statistical information. The data preprocessing system 100 analyzes the relations between various attributes in response to the user interactions. The data preprocessing system 100 generates transformation operations based on user interactions. The data preprocessing system 100 presents the generated transformation operations to users and receives selections of one or more generated transformation operations. The data preprocessing system 100 adds the selected transformation operations to the transformation script. The data preprocessing system 100 executes the transformation script on a larger dataset to preprocess the dataset for processing by the big data analysis system 130.

System Environment for Data Preprocessing

Figure 2:
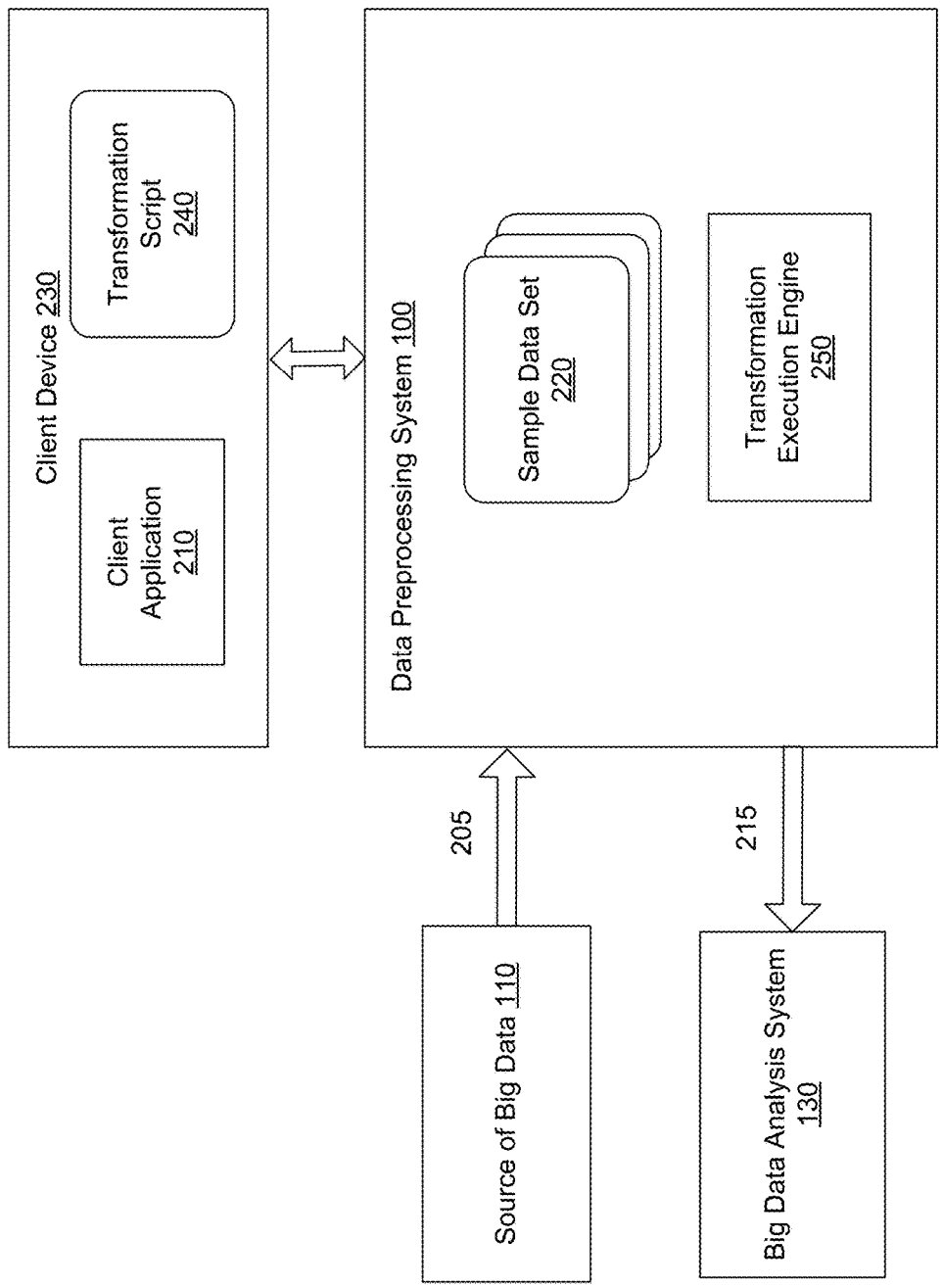
FIG. 2 shows the overall system environment illustrating details of data preprocessing system for preprocessing data for big data analysis, according to an embodiment.

FIG. 2 shows the overall system environment illustrating details of a data preprocessing system for preprocessing data for big data analysis, according to an embodiment. As described in connection with FIG. 1, the data preprocessing system 100 receives 205 data from sources of big data 110, preprocesses the data to improve the amount of data that conforms to the formatting constraints of the big data analysis system 130 and provides 215 the preprocessed data to the big data analysis system 130.

The data preprocessing system 100 configures for presentation, a user interface for interfacing with the data preprocessing system and presents the user interface to users via the client device 230, for example, as client application 210. The client device 230 executes the client application 110, thereby allowing a user to interact with the data preprocessing system 100, for example, to develop and/or test a transformation script 240 used for preprocessing the data. The transformation script 240 includes a set of transform operations (or a sequence of transform operations that are executed in a particular order.) The client application 110 may present the various user interfaces disclosed herein that present users with visual representations of statistical information describing a dataset. The client application 210 may be an internet browser that interacts with the data preprocessing system 100 via internet. Alternatively, the client application 210 may be a custom application that interacts with the data preprocessing system 100 using internet or proprietary communication protocols. The client application 210 includes various software modules, for example, a software module that renders and presents various histograms for attributes of the dataset.

In one embodiment, a computer system executing code for the data preprocessing system 100 or the client device 230 is a computer system executing, for example, a Microsoft Windows-compatible operating system (OS), Apple OS X, and/or a Linux distribution. In another embodiment, the computer system can be a device having computer functionality, such as a personal digital assistant (PDA), mobile telephone, video game system, etc. The computer system includes a non-transitory storage medium storing instructions that perform the various steps described herein. The client application 210 makes the client device 230 a special purpose computer system for performing analysis of data for preprocessing. Similarly, the computer system of the data preprocessing system 100 stores modules such as transformation execution engine 250 that makes the data preprocessing system 100 a special purpose computer system for performing preprocessing of data. The various systems shown in FIG. 2 may interact via a network (not shown in the figure.) The network enables communications between the various systems.

The data preprocessing system 100 receives datasets for processing from the sources of big data 110. A dataset comprises one or more attributes. In an embodiment, the attributes of the dataset are represented as columns and the dataset is represented as a set of columns. A column comprises a set of cells, each cell storing a cell value. Accordingly, the dataset may be represented as rows and column, where each row corresponds to a tuple including a value of each attribute.

The data obtained from the sources 110 of big data is typically too large to be viewed in a reasonable time by a user for purposes of preprocessing the data. In an embodiment, the data preprocessing system 100 receives requests from the user to generate sample datasets 220. The data preprocessing system 100 presents user interfaces to a user via the client application 210 to receive requests from the user for developing the transformation script. The requests for developing the transformation script include reviewing a sample dataset, executing a transformation command on the sample dataset, and determining whether to add the transformation command to the transformation script.

The transformation execution engine 250 executes one or more transformation commands or a transformation script against a sample dataset 220 or against the entire dataset received from a source of big data 110. In some embodiments, the execution of the transformation script on the entire dataset is performed by a system different from the data preprocessing system 100. The execution of the transformation script on the entire dataset may be performed as an offline (or batch process) that does not require interactions with users once the execution is started. Similarly, the analysis of a sample of dataset to determine statistical information describing the sample of dataset may be performed on the client device 230. However, the analysis of the entire dataset to determine statistical information describing the complete dataset is performed on the server, for example, the data preprocessing system 100. Often a data analyzer module identifies different statistical information by analyzing the complete dataset compared to analyzing only a sample. However, analysis of the complete dataset requires more computational resources.

The process of developing the transformation script is an iterative process that may require several interactions between the data preprocessing system 100 and the user via the client application 210. Once the transformation script 240 is finalized, the data preprocessing system 100 executes the transformation script 240 against the entire dataset received from the source of big data 110. The result of the execution of the transformation script 240 against the entire dataset is presented to the big data analysis system 130. This provides the big data analysis system 130 with data that has a much larger percentage of data that conforms to the formatting rules of the big data analysis system compared to the raw data provided by the sources of big data 110.

System Architecture of the Data Preprocessing System

Figure 3A:
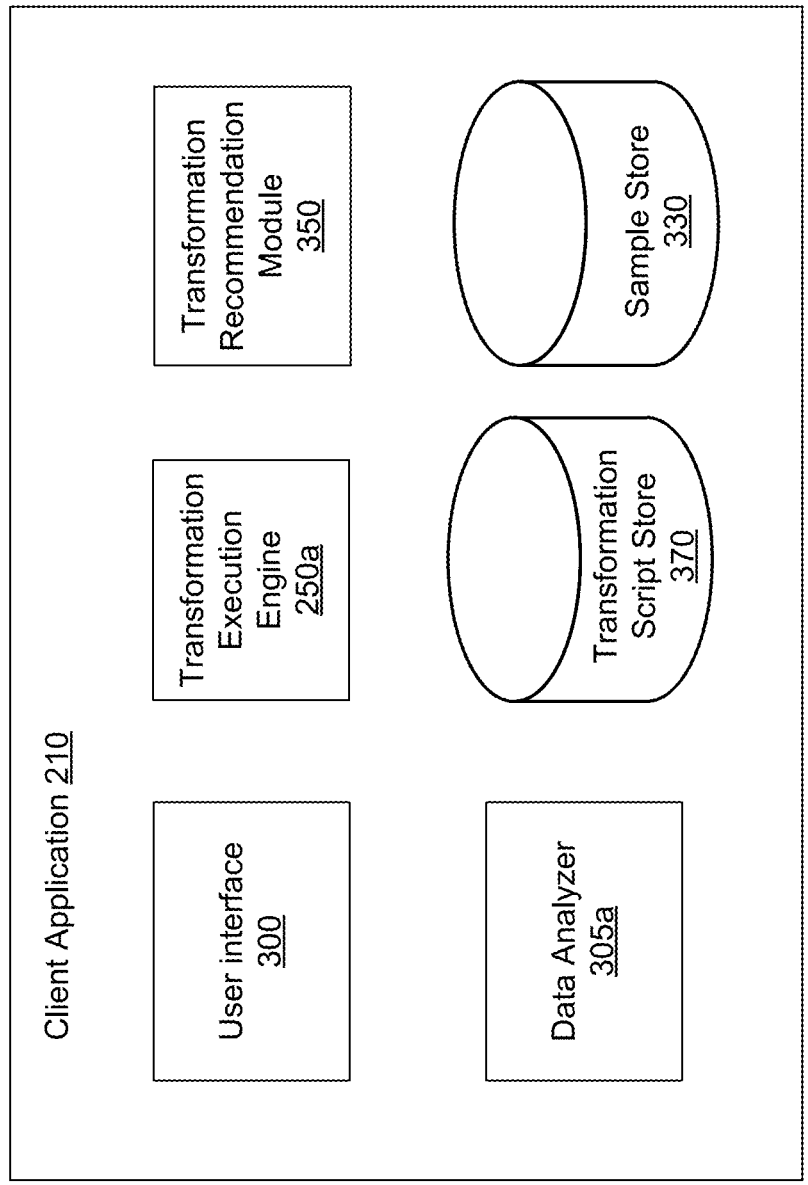
FIG. 3A shows architecture of a client application for interacting with a data processing system for developing transformation scripts for preprocessing data for big data analysis, according to an embodiment.

FIG. 3A shows the system architecture of a client application for interacting with a data processing system for developing transformation scripts for preprocessing data, according to an embodiment. The client application 210 includes a data analyzer 305, a transformation execution engine 250, a transformation recommendation module 350, a transformation script store 370, a user interface 300, a data analyzer 305, and a sample store 330. In other embodiments, the data preprocessing system 100 may include other modules not described herein. Functionality indicated as provided by a particular module may be implemented by other modules instead.

The user interface 300 presents information describing the dataset to the user and provides various widgets for allowing users to interact with the data. The information describing the dataset includes a textual representation of the data as well as charts describing the data. The user interface 300 presents transformation recommendations to the user and receives selections of transformation recommendations. The user interface 300 allows users to enter transformations manually via a text box.

The data analyzer 305 performs various types of analysis of the data of the sample of dataset being processed by the client application 210. For example, the data analyzer 305 determines the frequency of occurrence of various values of an attribute to provide information for displaying a histogram representing the attribute. The data analyzer 305 determines statistical information describing relations between attributes.

The transformation execution engine 250 receives transformations and executes the transformations for a given set of input datasets. In an embodiment, the transformation execution engine 250 receives a transformation script and executes the transformation script for a given set of input datasets. The transformation execution engine 250 includes instructions to execute various operators associated with the transformations. Examples of operators (or transformations based on the operators) include replacing a substring with another string, replacing a character with another character or string, replacing a substring at a particular location by another string (the location determined by identifying a character/substring and indicating whether the substring to be replaced occurs before/after the identified character/substring), splitting a column based on a separator into multiple columns, extract a substring from an attribute, joining two or more datasets based on join keys, aggregating records, grouping records, determining aggregate values of a column for groups of records based on certain criteria, filtering records based on certain criteria such that only records satisfying the given criteria are output by the transform operation, extracting an attribute within a composite attribute as a new column of the dataset, and so on.

The sample store 330 stores samples of various datasets stored in the dataset store 380. The data preprocessing system 100 provides these samples for use in developing and testing transformation scripts. The data preprocessing system 100 uses sample sets for development and testing of transformation scripts because the entire dataset received for processing may be very large. As a result, development and testing of transformation scripts based on an entire dataset may be slow since execution of each transformation on the entire dataset may take a long time. Samples stored in the sample store 330 may be determined by the sampling module 360 or by the transformation based sampling modules 340. The transformation scripts may be used for preprocessing datasets received for data analysis using the datasets, for example, using big data analysis systems 130.

The transformation script store 370 stores transformation scripts being developed by a user using the client application 210. The transformation script store 370 may represent each script as a sequence of transformation operations. The transformation script store 370 may associate each transformation operation of a transformation script with a sequence number representing an order in which the transformation operations are executed in the transformation script. In an embodiment, the transformation store 370 stores individual transformations using a text format, for example, a syntax of a proprietary script, syntax of a standard programming language, or using markup languages such as XML (extensible markup language).

The transformation recommendation module 350 presents users with various transformations that can be used for processing data of a dataset in a given context. The transformation recommendation module 350 may generate recommendations in response to certain user actions, for example, a selection of a data element or a portion of data element by the user. For example, assume that the user interface manager 310 receives a user selection of a portion of a data value "???" in a data element of a column specified using the client application 210. The user interface manager 310 provides information indicating the data value selected, the column of the data value, and so on. The transformation recommendation module 350 identifies various data transforms applicable to the user selection and sends them for display to the user via the user interface manager 310. In an embodiment, the transformation recommendation module 350 generates transformations based on statistical information describing distribution of an attribute or statistical information describing relations between attributes.

Figure 3B:
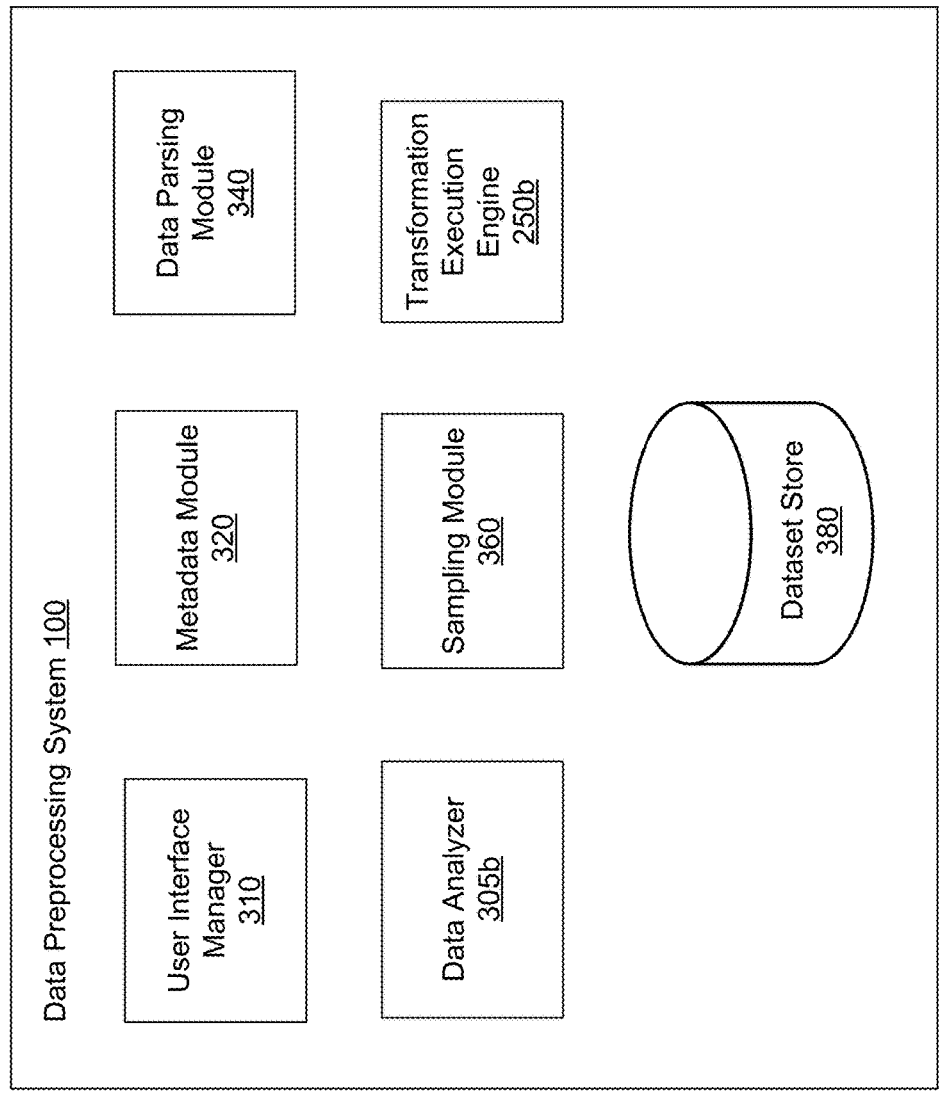
FIG. 3B shows the architecture of a data preprocessing system for preprocessing data for big data analysis, according to an embodiment.

FIG. 3B shows the architecture of a data preprocessing system for preprocessing data for big data analysis, according to an embodiment. The data preprocessing system 100 includes a user interface manager 310, a metadata module 320, a transformation recommendation module 350, a transformation execution engine 250, a sample store 330, a transformation script store 370, and a dataset store 380. In some embodiments, the data preprocessing system 100 includes other modules not described herein. Functionality indicated as provided by a particular module may be implemented by other modules instead.

Some of these modules are described above in connection with FIG. 3A. For example, a client application 210 may execute an operation on the client device 230 or send a request to the data preprocessing system 100 to perform the same operation. Some of the modules are stored on the data preprocessing system 100 so as to allow processing of the entire data set or a larger subset of the dataset. For example, the data analyzer 305a of the client application 210 performs data analysis within a sample stored in the client device 230 and the data analyzer 305b of the data preprocessing system 100 performs data analysis on the entire dataset stored in the dataset store 380 or on a subset of the dataset. Similarly, the transformation execution engine 250a of the client application 210 executes transformation on data of a sample stored in the client device 230 and the transformation execution engine 250b of the data preprocessing system 100 executes transformation on the entire dataset stored in the dataset store 380 or on a subset of the dataset.

The user interface manager 310 configures and presents various user interfaces to a client device 230 allowing a user to interact with the data preprocessing system 100. The user interfaces configured by the user interface manager 310 allow the user to identify datasets, specify transformations to be performed on the datasets, present information describing the datasets and so on. Various example user interfaces are described herein and presented as screenshots, for example, in FIGS. 4, 8, and 9.

In an embodiment, the user interface manager 310 configures a markup language document, for example, an HTML (hypertext markup language) document corresponding to a user interface. The user interface manager 310 sends the markup language document for presentation via an internet browser (that represents a client application 210) executing on a client device 230.

The dataset store 380 stores datasets and metadata describing the datasets. In an embodiment, the data preprocessing system 100 presents a user interface to a user allowing the user to specify a source of dataset. The user interface is presented to the user via the client application 210. The data preprocessing system 100 receives data for the dataset from the source and stores the dataset in the dataset store 380. The source of the dataset can be a file stored locally on the system executing the data preprocessing system 100, on a client device 230 used to provide the information, or on an external system. The data preprocessing system 100 receives information identifying the dataset, for example, a file address, a URL, or information identifying a data stream.

The metadata module 320 determines metadata describing the datasets received by the data preprocessing system 100. In an embodiment, the metadata module 320 takes a sample of rows and identifies row separators and column separators. By analyzing the various data values corresponding to columns, the metadata module 320 infers types of each column. In an embodiment, the metadata module 320 sends information describing the various column types to the user via the user interface manager 310. The user interface manager 310 presents the inferred metadata describing the various columns to the user via the client application 210. The client application 210 allows the user to modify the inferred column types, thereby reassigning one or more column types to a manually specified data types. The metadata module 320 receives the manually specified column types and updates the metadata stored in the dataset store 380 accordingly.

The data parsing module 340 parses data received by the data preprocessing system 100 to determine various parts or components of data, for example, various parts of a row of data or a record of data. The data parsing module 340 identifies record separators, for example, based on newline characters to determine where one record of the dataset ends and the next record begins. The data parsing module 340 may also be stored in the client application 210 (not shown in FIG. 3A).

User Interface for Preprocessing Data for Big Data Analysis

Figure 4:
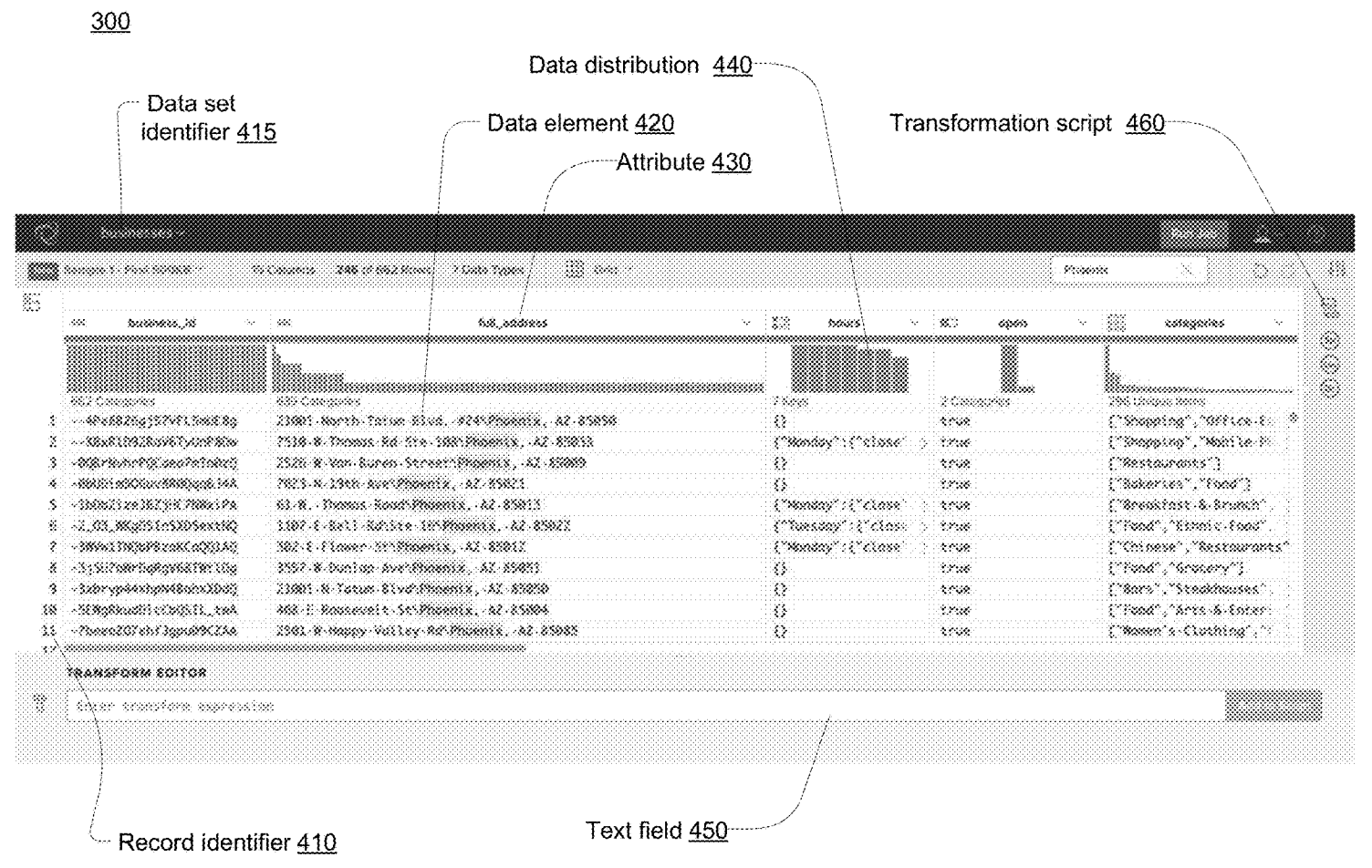

The data preprocessing system 100 allows users to interact with the data being analyzed for purposes of defining various transformations and generating samples of data. The user interface manager 310 renders user interfaces and sends information describing a user interface for presentation to the user via the client application 210. The screenshot illustrated in FIG. 4 is an example of a user interface presented to a user visa the client application 210. The data preprocessing system 100 can configure the user interfaces in various ways, for example, by using different widgets than those indicated in the user interfaces, arranging the various user interface elements in different positions than indicated, and so on.

FIG. 4 shows a screenshot of a user interface illustrating various interactions with the data preprocessing system, according to an embodiment. The user interface 300 may be presented by the client application 210 via the client device 230. The user interface 300 presents information describing a sample of a dataset stored on the data preprocessing system 100. The user interface 300 presents the data of various attributes in textual form as well as using a visual representation, for example, histograms.

The user interface 300 shown in FIG. 4 shows information describing a dataset identified by the dataset identifier 415 (e.g., "Farmers Market Dataset".) A user may upload the dataset from a source of dataset that can be an external system, a file stored on a local machine or in the cloud, or any other mechanism for storing the data. The user specifies a dataset identifier 415 for each dataset that is loaded. The process of loading the dataset is not illustrated in the screenshot of FIG. 4 and occurs before the data preprocessing system 100 presents the user with the screenshot shown in FIG. 4.

The user interface 300 shown in FIG. 4 presents a subset of data of the dataset being processed, for example, a sample of a dataset stored on the data preprocessing system 100. The user interface may show only a subset of the sample. The data of the dataset shown in FIG. 4 represents information describing farmers markets.

The dataset includes a set of attributes 430 (an attribute may also be referred to as a data field.) Each attribute stores a particular type of data. For example, the attribute 430b stores a URL (uniform resource locator), the attribute 430a stores a textual description of a farmer's market. As shown in FIG. 4, each attribute 430 is represented as a column with the name of the attribute 430 displayed at the top of the column.

A type of the attribute is associated with certain formatting rules (or type rules) associated with the data. The formatting rules specify characteristics of the data of the attribute. The attribute 430b represents a URL that is expected to be of the format "http:" followed by a website address. The attribute 430 storing description of the farmer's markets may be associated with the attribute 430 that the text representing the description may not include certain special characters, such as '?'.

The subset of data presented in the user interface 300 comprises a plurality of records. Each record comprises values for attributes of the dataset. A value may be empty. A record is identified by a record identifier 410 that represents a unique value associated with the record. As shown in FIG. 4, the data of the dataset is organized as rows and columns, with each column representing an attribute and each row representing a record.

An attribute 430 may store data that does not conform to the formatting rules associated with the attribute. For example, data element 420a stores value "http;www.highlandsnj.com" that does not conform to the formatting rules of the attribute. Specifically, the data element 420a is not of the form "http:" followed by the web page address since it stores a prefix "http;". Similarly, data element 420b does not conform to the formatting rules of the description field since it includes '?' characters.

The user interface 300 presents statistical information describing the attributes. As shown in FIG. 4, the user interface 300 shows visualization of the data distribution 440 of each field. The data distribution 440 is shown using a visual representation such as a chart. In an embodiment, a visual representation of an attribute shows geometric shapes (for example, rectangles or bars) representing statistical information describing the attribute.

As an example, statistical information describing an attribute is shown as a histogram. The histogram may be represented as a bar chart such that each bar represents a distinct data value of the attribute. Alternatively, each bar may represent a set of values of the data elements of the attribute. For example, if an attribute occupies a very large number of distinct values, the data preprocessing system 100 divides the attribute values into buckets. Each bar of the histogram displayed represents a bucket representing a set or range of values of the attribute.

The user interface 300 allows users to interact with the geometric shapes of the visual representation of an attribute, for example, bars of a histogram representing the data distribution 440 of the attribute. For example, if a user hovers over (or selects) a particular bar of the histogram with a pointing devices such as a mouse, the user interface 300 displays information describing that particular bar including the number of elements of the dataset having the data value or data values associated with the bar and/or the data value or data values corresponding to the bar. Other interactions of the user with the bar are further described herein.

The user interface 300 shown in FIG. 4 presents the user with a text field 450 for allowing users to input transformations. A user may specify a transformation (also referred to as transformation rules or transformation operation or a transform) for preprocessing the data of a dataset thereby increasing the amount of data that can be analyzed by the big data analysis system 130. For example, the transformations may process data elements having data formatting errors as described above to eliminate the errors.

The transformations added by the user are included in the transformation script 460. FIG. 4 shows the transformation script as empty since the user has not yet added any transform operations to the transformation script 460. However, as the user interacts with the dataset via the user interface 300, the user adds transformations using the text field 450 that are included in the transformation script 460.

Figure 5A:
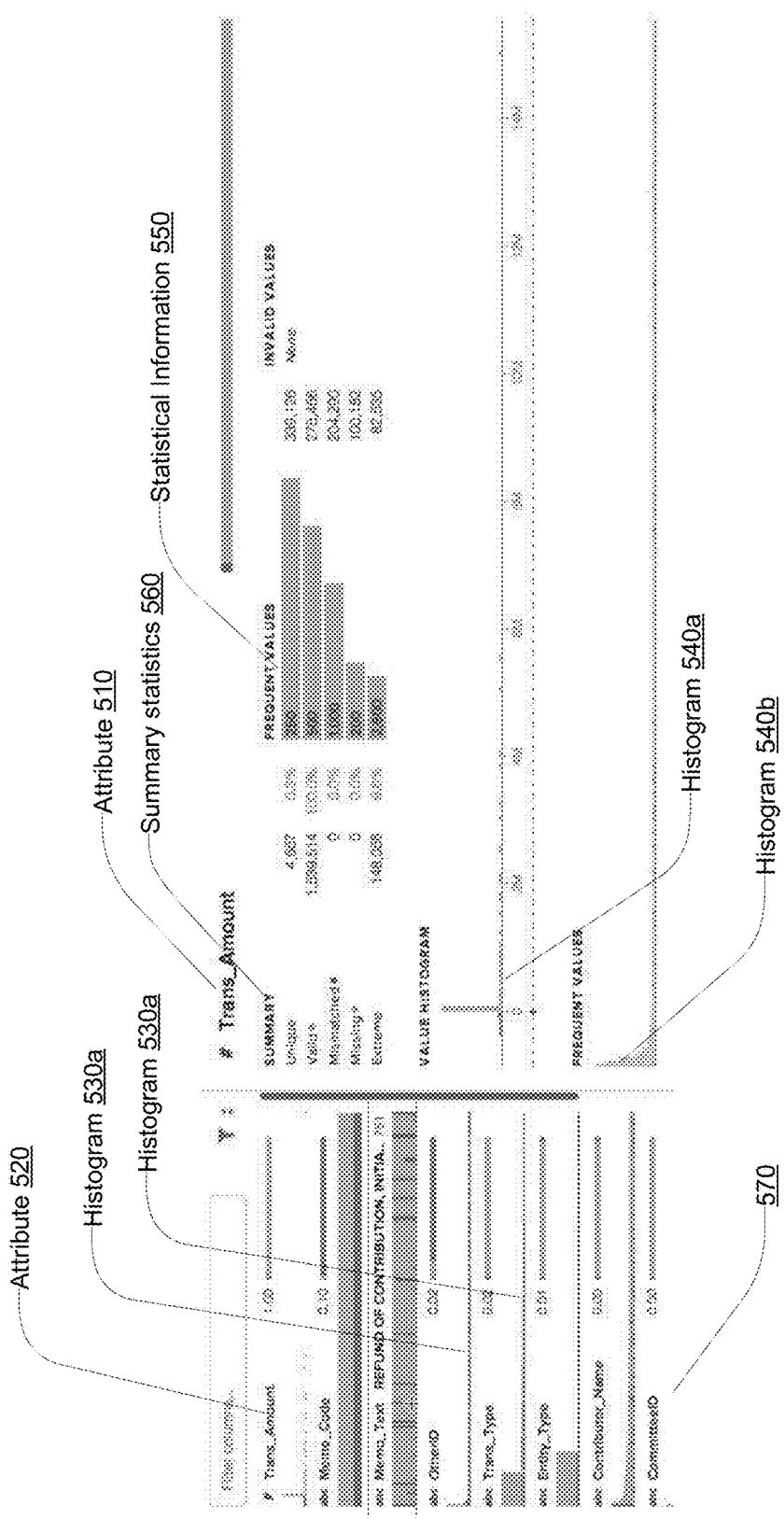
FIG. 5A shows a screenshot of a user interface illustrating user interactions based on visual representation of data profiles, according to an embodiment.

FIG. 5A shows a screenshot of a user interface illustrating user interactions based on visual representation of data profiles, according to an embodiment. The user interface 300 may be presented by the client application 210 via the client device 230. As shown in FIG. 5, the user interface shows visual representation of statistical information describing attributes of a dataset. The visual representation shown in FIG. 5 includes histograms of various attributes.

In an embodiment, the user interface 300 includes a portion (e.g., panel 570) that shows histograms describing at least a plurality of attributes of the dataset being analyzed. The user interface 300 receives a selection of an attribute 510 as a primary attribute for which detailed statistical information is presented. The user interface 300 also presents smaller charts based on statistical information of all the attributes of the dataset on a panel 570. The user interface 300 presents the primary attribute using larger charts compared to the charts of the attributes in the panel 570.

The user interface 300 presents a value histogram 540a that shows the distribution of various values of the primary attribute. The value histogram 540a shows bins based on values of the attribute in increasing order of values along the x-axis and the frequency of occurrence of values of the primary attribute in each bin along the y-axis.

The user interface 300 further presents a frequent values histogram 540b that sorts the bins ranked by the frequency of occurrence of values for each bin. As shown in FIG. 5A, the bins of the frequent values histogram 540b are ranked in decreasing order of frequency. Accordingly, the bin with the highest frequency is shown first along the x-axis, followed by the bin with the second highest frequency, and so on.

The user interface 300 also shows summary statistics 560 describing values of the primary attribute categorized based on different criteria. For example, the summary statistics 560 includes frequency of values categorized as unique, valid, mismatched, missing, and extreme. The data analyzer 305 determines the frequencies of values of an attribute corresponding to each category.

For example the data analyzer 305 determines the frequency of mismatched values of an attribute as values that do not meet certain constraints associated with the attribute. These constraints include type constraints, format for the value, size of value, and so on, that need to be satisfied by values of the attribute. Values that satisfy the constraints are more likely to be processed by the big data analysis system 130. Values that do not satisfy the constraints may need pre-processing that transforms the values to new values that satisfy the constraints. The transformations are configured to increase the amount of data of the dataset that can be processed by the big data analysis system 130.

The data analyzer 305 determines the frequency of extreme values of an attribute as values that are outliers in a distribution of the values of the attribute. The data analyzer 305 determines the distribution of the attribute, for example, the mean and standard deviation values. The data analyzer 305 determines the extreme values or outliers as values that are more than a threshold number of standard deviations away from the mean values. The user interface 300 presents statistical information describing the extreme values as this information may be of interest for certain attributes. In particular, if the values of attributes are expected to not vary significantly, the number of extreme values provides an indication to the user that the attribute may need preprocessing.

The data analyzer 305 determines the missing values of each attribute as values that are null or empty. The data analyzer 305 determines the unique values of each attribute as the total number of distinct values of the attribute. The data analyzer 305 determines the valid values of each attribute as the total number of values of the attribute that satisfy the constraints associated with the attribute.

The user interface 300 also presents statistical information 550 of the top few values as ranked by their frequency. This allows a user to view the highest occurring values of the primary attribute.

The user interface 300 ranks the visual representations (e.g., histograms) of the plurality of attributes of the data set presented in the panel 570. The ranking may be specified by a user or may be based on a configuration parameter. The user interface 300 provides various alternatives to the user with criteria for ranking the visual representations of the attributes.

In an embodiment, the user interface 300 sorts the plurality of attributes of the dataset based on the number of missing values of each attribute. The data analyzer 305 determines the total number of missing values for each attribute. Upon request, the data analyzer 305 ranks the attributes based on the number of missing values of each attribute and provides the ranking to the user interface 300. The user interface 300 presents the attributes in the ranked order.

In another embodiment, the user interface 300 sorts the plurality of attributes of the dataset based on the number of mismatched values of each attribute. The data analyzer 305 determines the total number of mismatched values for each attribute. Upon request, the data analyzer 305 ranks the attributes based on the number of mismatched values of each attribute and provides the ranking to the user interface 300. The user interface 300 presents the attributes in the ranked order.

In another embodiment, the user interface 300 sorts the plurality of attributes of the dataset based on the number of extreme values of each attribute. The data analyzer 305 determines the total number of extreme values for each attribute. Upon request, the data analyzer 305 ranks the attributes based on the number of extreme values of each attribute and provides the ranking to the user interface 300. The user interface 300 presents the attributes in the ranked order.

In another embodiment, the user interface 300 sorts the plurality of attributes of the dataset based on the similarity of the attribute with the primary attribute selected by the user. The data analyzer 305 determines the similarity of two attributes by comparing statistical information describing the two attributes. In an embodiment, the data analyzer 305 determines similarity between two attributes as a weighted aggregate value of parameters that specify the distribution of the attributes. These parameters may include one or more of the mean, the standard deviation of the attributes, or a number of outliers of the attributes. An outlier is a value that is more than a threshold number of standard deviations away from the mean.

The data analyzer 305 determines the total number of extreme values for each attribute. Upon request, the data analyzer 305 ranks the attributes based on the number of extreme values of each attribute. The data analyzer 305 provides the ranking to the user interface 300. The user interface 300 presents the attributes in the ranked order.

In an embodiment, the user interface 300 allows users to specify a subset of data of an attribute. For example, the user interface 300n receives a selection of a set of bins from a histogram 540 of the primary attribute. The user may select a set of bins to better analyze the subset of values of the attributes from the selected bins. For example, the user interface 300 may receive a selection of bins that are close to the mean. Alternatively, the user interface 300 may receive a selection of bins representing outlier values.

The data analyzer 305 receives the selection of bins of the primary attribute (or any other attribute that the user selects) from the user interface 300. The data analyzer 305 identifies the bins of the remaining attributes that are associated with values occurring within the bins of the selected attribute. For example, assume that the user selects bin B1 of an attribute A1. Assume that the dataset includes another attribute A2. The data analyzer 305 identifies all bins of attribute A2 comprising data values of attribute A2 that are associated with (i.e., occur in the same tuple of the dataset as the) data values of attribute A1 occurring within the selected bin B1. Assume that these include bins B2 and B3 of attribute A2. Furthermore, the data analyzer 305 determines the frequency of the values of bins B2 and B3 (of attribute A2) that are associated with the values of bin B1 (of attribute A1). The data analyzer 305 sends the determined information to the user interface 300 for presentation.

The user interface 300 presents the frequency of the values of bins B2, B3 that are associated with the values of bin B1 as an overlapping histogram over the histogram of the attribute A2. In an embodiment, the shapes (e.g., rectangles) of the histogram of the values of B2, B3 associated with the values of bin B1 are shown so as to distinguish them from the shapes of the histogram of the attribute A2. The shapes may be distinguished based on color, shading, texture, overlapping text, or any other attribute of the shapes.

Figure 5B:
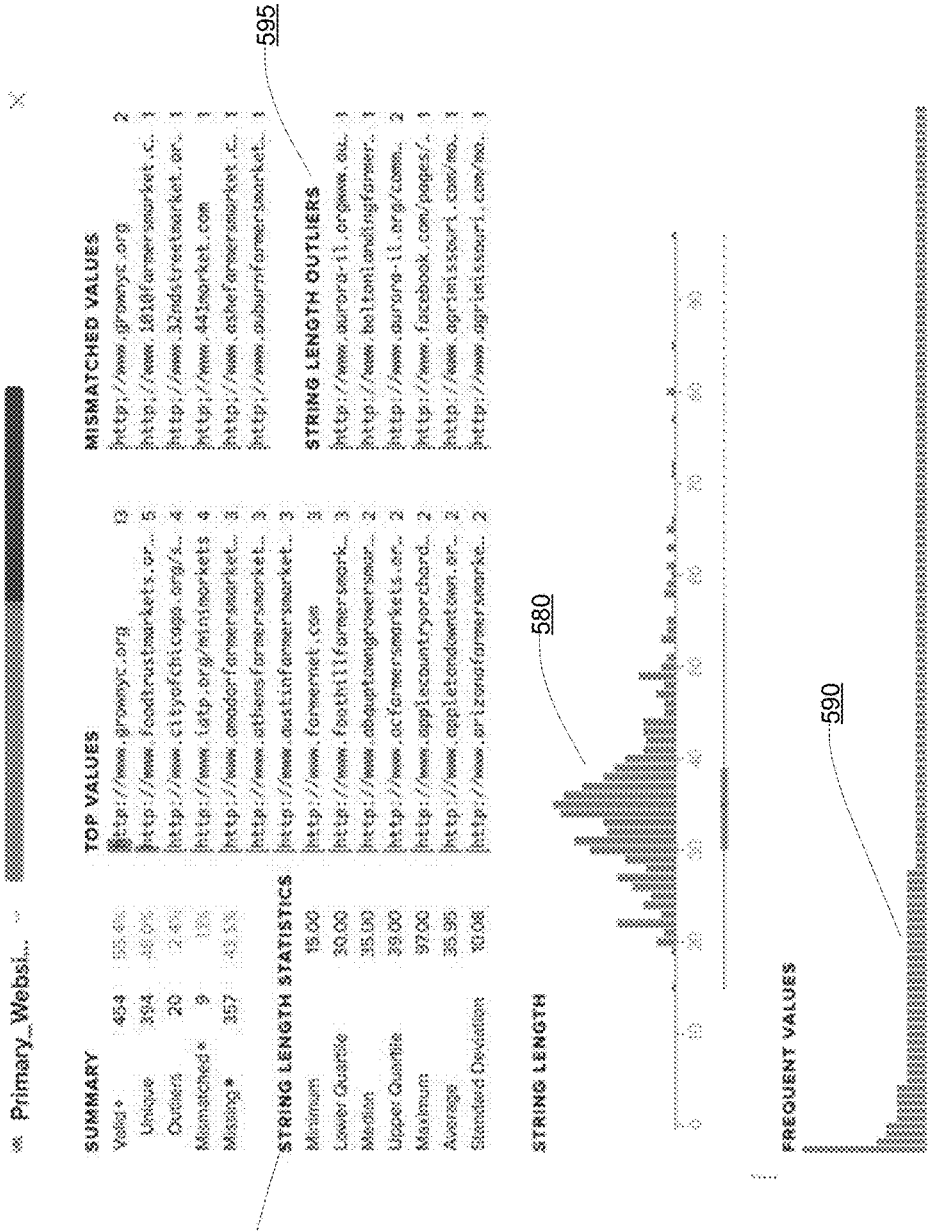
FIG. 5B shows a screenshot of a user interface illustrating presentation of statistical information describing string length of an attribute, according to an embodiment.

In an embodiment, the statistical information describing string length of an attribute is presented. FIG. 5B shows a screenshot of a user interface illustrating presentation of statistical information describing string length of an attribute, according to an embodiment. The statistical information 585 presented to the user includes minimum and maximum string lengths, lower and upper quartile values, media value of string length, average string length, and standard deviation of string lengths.

The user interface 300 shows a histogram based on the string length. Accordingly, the data analyzer 305 determines various bins for the string length and determines the frequency of occurrence of the string lengths for each bin. The histogram 580 allows a user to identify any outliers. The user interface 300 also presents string length outliers 595. If a user selects the outliers using either the bins of the histogram 580 or using the outlier values 595, the user is presented with recommendations of transformation as illustrated in FIG. 10. A recommendation of transformation allows the user to either set the selected value or values to another value, for example, a substring of the original value. Alternatively, a recommendation of transformation may allow a user to derive a new value based on the selected values and store the derived value in a new column.

Overall Process

Identifying statistical information of values of other attributes based on selection of a subset of values from an attribute is a computation intensive process. The following process allows calculation of the values of other attributes that are related to a selected subset of bins from an attribute.

Figure 6:
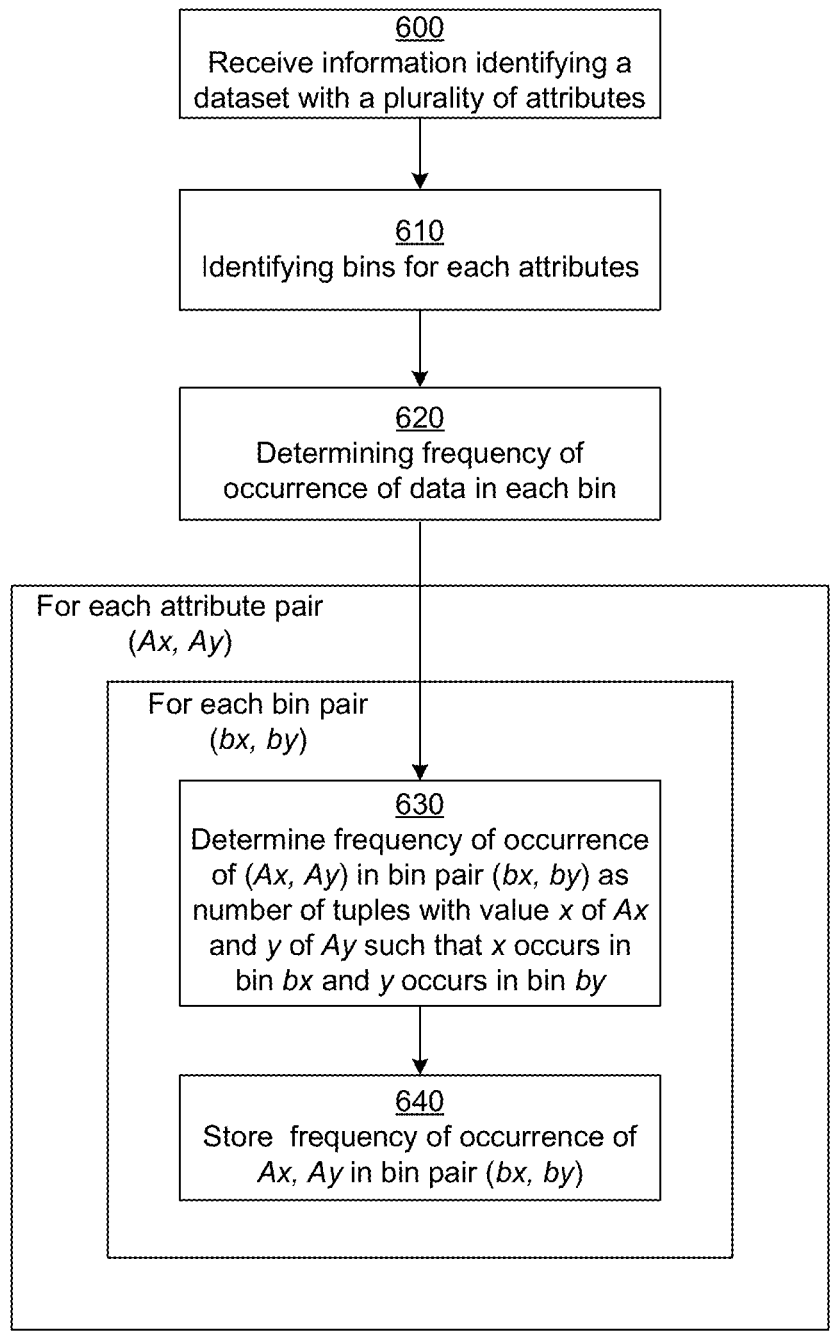
FIG. 6 shows the overall process of determining frequency of related values for bin pairs for attribute pairs, according to an embodiment.

FIG. 6 shows the overall process of determining frequency of related values for bin pairs for attribute pairs, according to an embodiment. Various steps discussed can be executed in an order different from that shown herein. Furthermore, specific steps can be executed by modules different from those indicated herein.

The data preprocessing system 100 receives 600 information identifying a dataset comprising a plurality of attributes. Each attribute may be represented as a column of the dataset. Each row of the dataset corresponds to a tuple of values, each value of the tuple for an attribute of the dataset. All values of a tuple are considered to be related to each other.

The data analyzer 305 identifies 610 bins for each attribute. In an embodiment, the data analyzer identifies the range of values of an attribute to determine the bins for the attribute. The range of values is determined based on the lowest value and the highest value. The data analyzer 305 divides the range of values into sub-ranges, each sub-range corresponding to a bin. In general the data analyzer 305 associates each bin of an attribute with a range of values or a set of values.

In an embodiment, the data analyzer 305 determines the bins as follows. The data analyzer 305 receives a maximum number of bins and a minimum number of bins. The data analyzer 305 initializes a sub-range size for the bins. The data analyzer 305 determines the number of bins generated for the current sub-range size. If the number of bins is determined to be above the maximum threshold, the data analyzer 305 assigns a larger value to the current sub-range size of the bins. The data analyzer 305 determines whether the number of bins is above the maximum threshold value at each iteration and continues to grow the sub-range size.

In some embodiments, the data analyzer 305 grows the sub-range size by an order of magnitude, for example, by doubling the sub-range size in each iteration or growing the sub-range size by a factor of 10 in each iteration. In some embodiments once the data analyzer 305 determines that the number of bins is below the threshold for the current sub-range size, the data analyzer tries smaller sub-range sizes to increase the number of bins while still keeping the total number of bins below the maximum threshold value. The data analyzer 305 may decrease the sub-range sizes linearly to make sure that the number of bins doesn't increase above the maximum threshold.

The data analyzer 305 determines frequency of occurrence of data for each bin of each attribute. In an embodiment, the data analyzer 305 counts the number of times values of an attribute occur in a bin. The data analyzer 305 determines that a value of an attribute occurs in a bin if the value is within the range (or the set) of values associated with the bin.

The data analyzer 305 determines frequency of occurrence of bin pairs as follows. The data analyzer 305 performs the following steps for each attribute pair (Ax, Ay). Accordingly, for each bin pair (bx, by) for the attribute pair (Ax, Ay), the data analyzer 305 performs steps 630 and 640. For each bin pair (bx, by) corresponding to attribute pair (Ax, Ay), the data analyzer 305 determines 630 the frequency of occurrence of tuples of the dataset such that the tuple includes a value x of attribute Ax that falls in bin x and a value y of attribute Ay such that y falls in bin by. The data analyzer 305 stores 640 the frequency of occurrence of each bin pair (bx, by) for each attribute pair (Ax, Ay).

Figure 7:
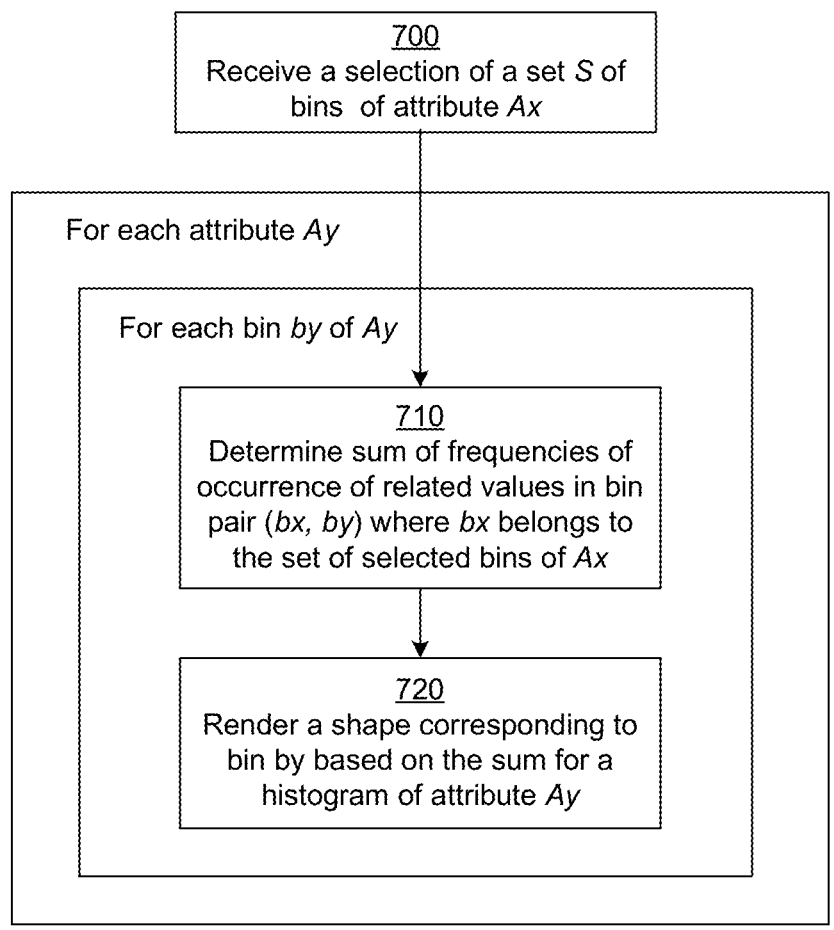
FIG. 7 shows the overall process of determining statistical distribution of data related to a subset of data selected from one attribute, according to an embodiment.

The data analyzer 305 uses the frequency values for bin pairs for determining histograms of related attribute values based on selections of bins of an attribute. FIG. 7 shows the overall process of determining statistical distribution of data related to a selection of bins of an attribute, according to an embodiment.

The user interface 300 receives a selection of a set S of bins of an attribute. In an embodiment, the user interface 300 receives a selection of one or more shapes from the histograms 540 describing the primary attribute presented to the user. The selection of bins may be for any other histogram presented to the user, for example, histogram 530. In other embodiments, the user interface 300 receives from a user, a description of the set S of bins, for example, in text format providing information describing each bin. The user interface 300 sends the selection of the set S of bins of the attribute to the data analyzer 305.

The data analyzer 305 determines 630 the frequency of occurrence of values for each bin of attributes of the dataset such that the values are related to the selected bins. Accordingly, the data analyzer 305 performs the steps 710 and 720 for each attribute Ay and each bin by of the attribute Ay. These steps may be performed for all attributes of the dataset or for a subset of attributes of the dataset. The data analyzer 305 determines 710 the sum of frequencies of occurrence of related values in bin pair (bx, by) for each bin bx belonging to the set S of selected bins.

For example, if the set S includes bins b1, b2, and b3, the data analyzer 305 determines for bin by of attribute Ay, sum of frequencies of related values for bin pairs (b1, by), (b2, by), and (b3, by). The data analyzer 305 provides the results of the determining 710 step to the user interface 300. The user interface 300 renders 720 the shape corresponding to the bin by based on the sum value received from the data analyzer 305. The shapes rendered 720 for each bin by for the attribute Ay form the histogram for the attribute Ay.

The histograms for attribute Ay may be presented as geometric shapes associated with the bins. For example, the user interface may show a rectangular shape for each bin such that the length of each bin is proportionate to the frequency of occurrence for the bin. In other embodiments, the histogram may be presented differently.

Figure 8:
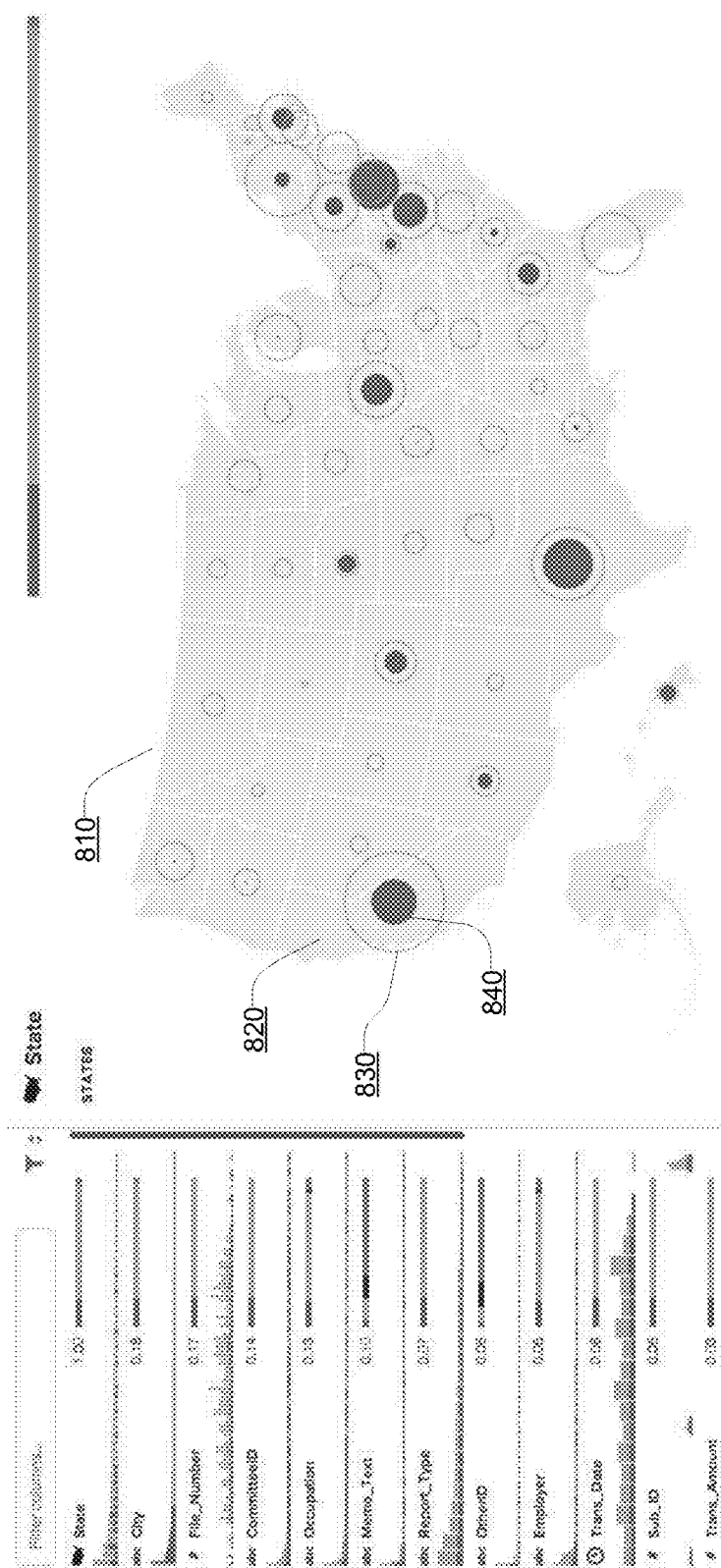
FIG. 8 shows a screenshot of a user interface illustrating presentation of statistical information describing datasets associated with geographical locations, according to an embodiment.

FIG. 8 shows a screenshot of a user interface illustrating presentation of datasets associated with geographical locations, according to an embodiment. As an example, an attribute of the dataset may represent an address. Alternatively, the records of the dataset may represent transactions that are associated with geographic locations, for example, cities, states, or countries. If the user interface 300 receives a selection of a set of bins of an attribute of the dataset, the user interface 300 shows statistical information describing distribution of other attribute values related to the selected bins.

As shown in FIG. 8, the user interface 300 shows geometric shapes corresponding to bins of an attribute. These geometric shapes can be circles, rectangles, squares, or polygons but are not limited to these. The geometric shapes are shown along with a geographic map covering regions associated with the bins being displayed. For example, if the dataset describes information related to United States (US), a map of US is shown.

The user interface 300 shows two geometric shapes, 830 and 840 for a bin. The geometric shapes are associated with a portion 820 of the map 810. For example, if a bin represents data for a particular state, the geometric shapes 830, 840 for the bin are shown in association with the state 820. FIG. 8 assumes that the user interface 300 receives a selection of a set of bins of an attribute A1. The data shown associated with the map corresponds to a second attribute A2. Each outer circle 830 represents the frequency of occurrence of values of attribute A2 for a bin. The inner circle 830 represents a measure of relative frequency of values of A2 with respect to the selected subset of A1. The relative frequency of A2 for a bin represents the size of the subset of values of A2 occurring in the bin that are related to the selected subset of bins of attribute A1. A value v1 of attribute A1 is related to value v2 of attribute A2 if there is a tuple of the dataset in which attribute A1 has value v1 and attribute A2 has value v2. The two geometric shapes associated with a bin may be different type of shapes. For example, the geometric shape representing the frequency of occurrence of values of attribute A2 (corresponding to circle 830) may be a square and the geometric shape representing the relative frequency of occurrence of A2 with respect to a selected subset of A1 (corresponding to circle 840) may be a circle. Alternatively, the geometric shape representing the frequency of occurrence of values of Attribute A2 may be a circle and the geometric shape representing the relative frequency of occurrence of A2 with respect to a selected subset of A1 may be a square.

Each geometric shape has a parameter based on the size of the data represented by the geometric shape. As shown in FIG. 8, the size of each geometric shape is proportionate to the size of the value represented by the geometric shape (e.g., the frequency of occurrence of values in a bin represented by the geometric shape). In other embodiments, other parameters of the geometric shape may depend on the size of the value being represented by the geometric shape, for example, color or shading. For example, a geometric shape representing larger value may have darker shade compared to a geometric shape representing smaller value. Similarly, different values represented by the geometric shapes may be mapped to different colors such that the color of the geometric shape depends on the value represented by the geometric shape.

In an embodiment, as the user changes the selection of the bins of the attribute A1, the user interface 300 dynamically changes the sizes of the geometric shapes 840 based on the changes in the value of the relative frequency of attribute A2 with respect to attribute A1.

In an embodiment, statistical information describing the same attribute may be presented in multiple ways. For example, the attribute values may be binned in a plurality of different ways. For example, an address field may be binned using the state of the address, the city of the address, and by the county of the address. Accordingly, the same attribute may be represented by multiple histograms, each histogram corresponding to a binning strategy.

Figure 9:
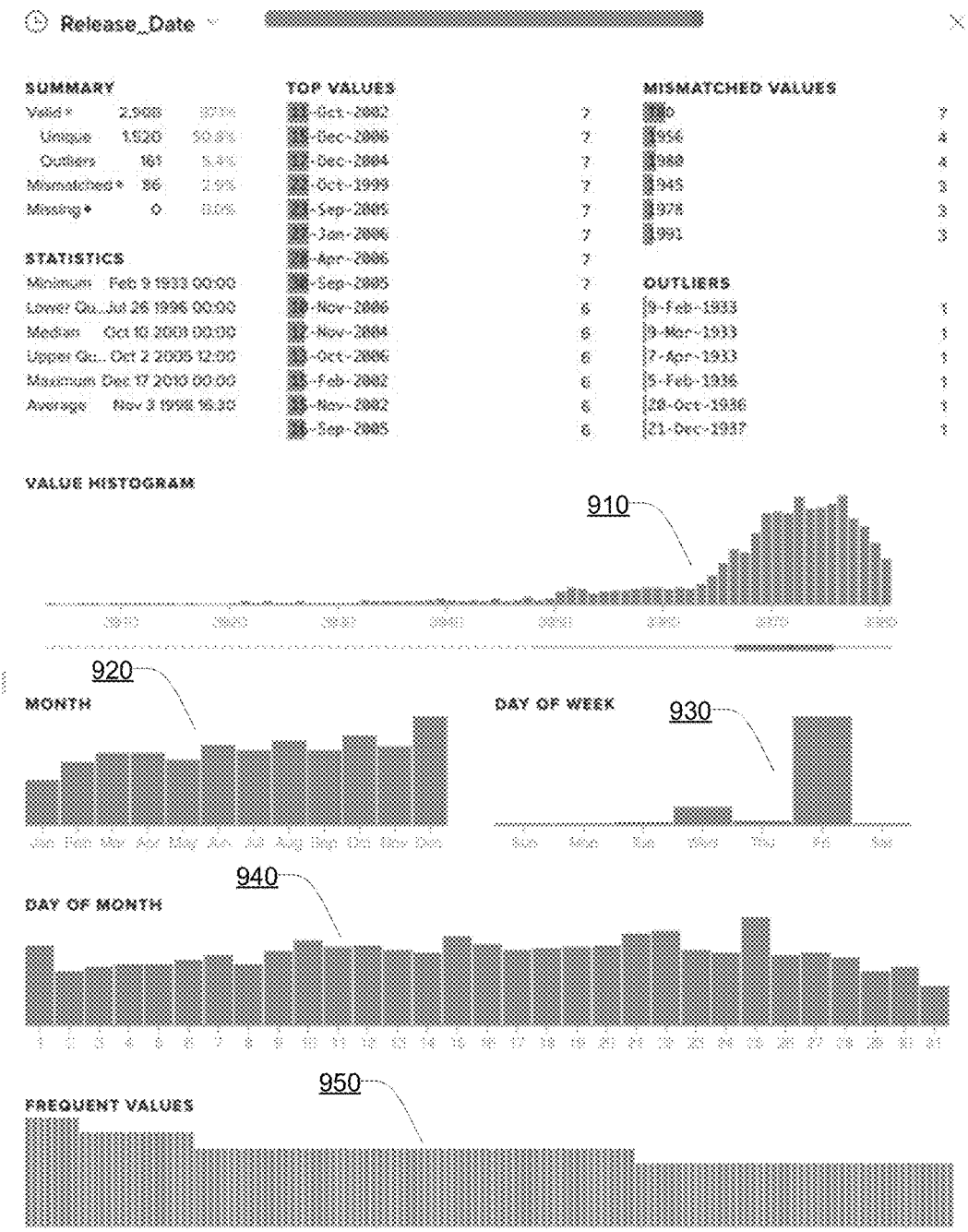
FIG. 9 shows a screenshot of a user interface illustrating presentation of statistical information describing periodic data, according to an embodiment.

As another example, an attribute representing a time value may be binned in various ways including, bins corresponding to ranges of time, bins representing day if the week, bins representing day of the month, bin representing month within the year and so on. FIG. 9 shows a screenshot of a user interface illustrating presentation of statistical information describing statistical information describing periodic data, according to an embodiment. Accordingly, FIG. 9 shows a histogram 920 representing frequency of distribution of the data values binned using months of the year, histogram 930 representing frequency of distribution of the data values binned using on day of the week, histogram 940 representing frequency of distribution of the data values binned using on day of the month, and histogram 910 representing frequency of distribution of the data values binned using consecutive time ranges. If there are other ways in which an attribute is binned the user interface 300 presents histograms corresponding to each binning strategy. Histogram 950 shows the frequencies of different values ranked in decreasing order of frequency of occurrences.

In an embodiment, if the user interface 300 receives a selection of a set of bins from one of the histograms presented in FIG. 9, the remaining histograms show the relative frequency of occurrence of the same attribute for different bins. For example, if the user selects a set of bins in histogram 910, the histogram 920 shows the relative frequency of occurrence for each bin in histograms 920, 930, 940, and 950 with respect to the selected set of bins of histogram 910.

Figure 10A:
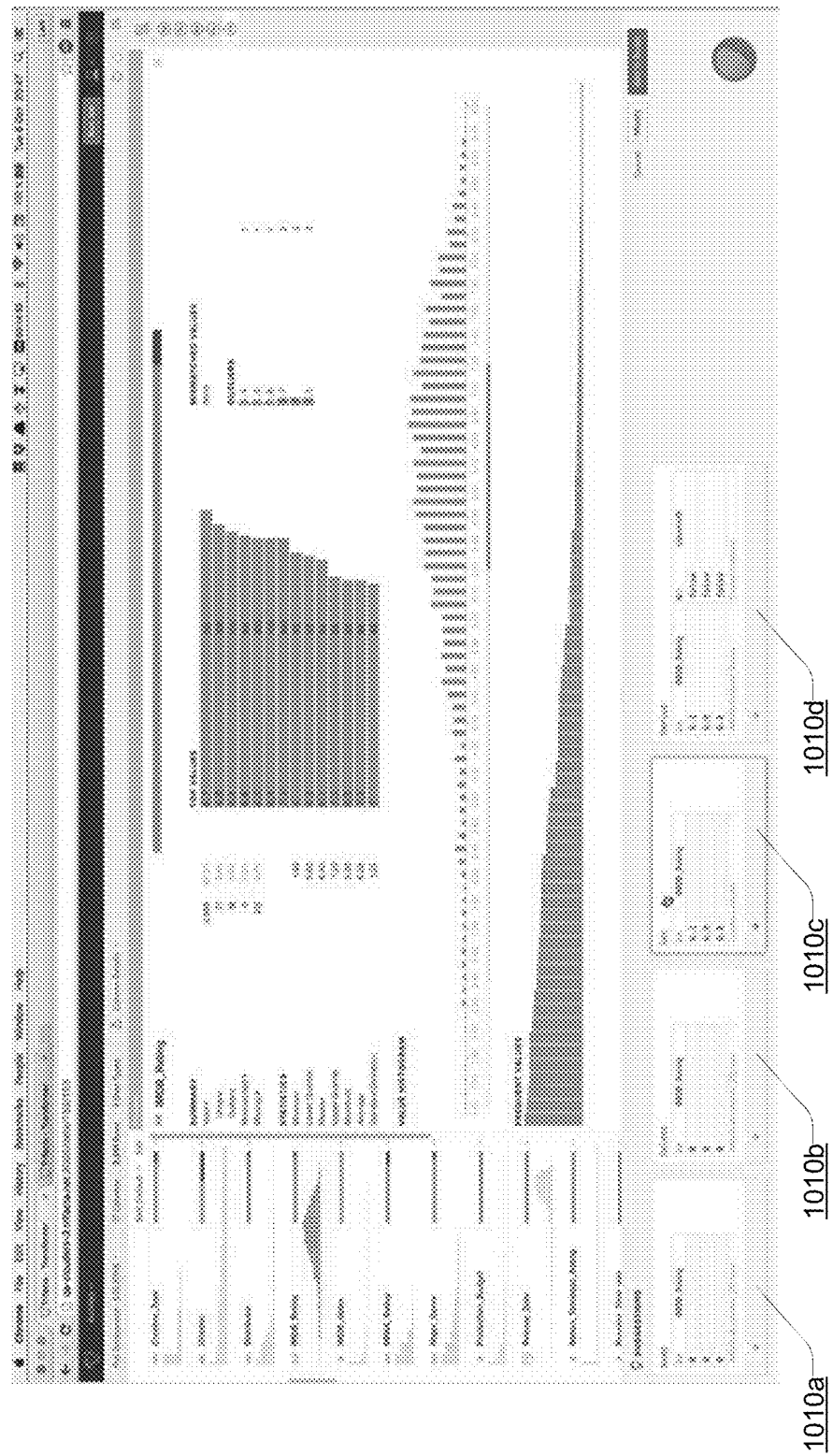
FIGS. 10A and 10B show screenshots of a user interface illustrating recommendations of transformations based on selection of bins of a histogram, according to an embodiment.
Figure 10B:
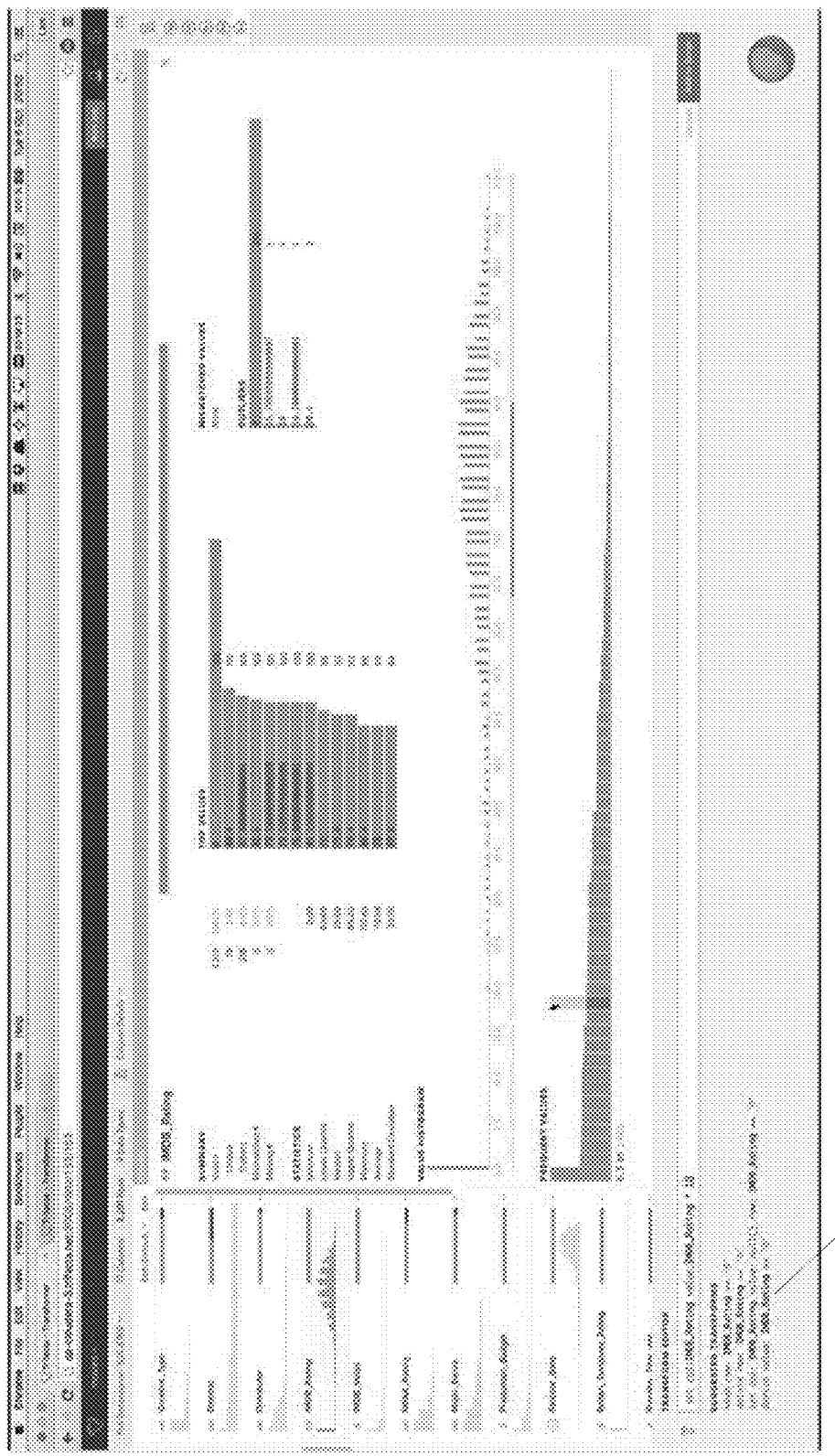

FIGS. 10A and 10B show screenshots of a user interface illustrating presentation of recommendations of transformations based on selection of bins of a histogram, according to an embodiment. FIG. 10A shows the recommendations 1010 presented visually in a panel that shows the result of applying the transformation. FIG. 10B shows the recommendations 1020 presented in a text form as commands. The transformation recommendation module 350 generates recommendations of transformations to user based on selections of bins of histograms by the user. The recommendations of transformations include a recommendation 1010a to keep the records corresponding to values from the selected bins, a recommendation 1010b to delete the records corresponding to values from the selected bins, a recommendation 1010c to set values from the selected bins to a different value as defined by the transformation rule (for example, the value may be truncated to a smaller value, a substring of the value of be modified or deleted, and so on), and a recommendation 1010d to derive a new values corresponding to each value from the selected bins. The derived value based on recommendation 1010d may be stored in a new column.

In an embodiment, the transformation recommendation module 350 determines recommendation of transformations based on the portion of the histogram of an attribute selected by the user. For example, the transformation recommendation module 350 may recommend a first transformation operation when the user selects a first subset of bins of a histogram of an attribute and a second transformation operation when the user selects a second subset of the bins of the histogram of the attribute. In another embodiment, the transformation recommendation module 350 determines the ranking of the transformations for presenting to the user based on the selected subset of the bins of the histogram of the attribute. For example, the data preprocessing system 100 presents a set of transformation operations having a first ranking when the user selects a first subset of bins of the attribute and the data preprocessing system 100 presents the same set of transformation operations based on a second ranking when the user selects a second subset of bins of the attribute.

In an embodiment, the transformation recommendation module 350 determines recommendations of transformations based on other attributes that are related to the attribute of the histogram being selected by the user. For example, data analyzer 305 receives information describing a portion (a subset of bins) of a histogram selected by a user. The data analyzer 305 determines distribution of the data values of the remaining attributes that are related to the portion of the histogram selected (for example, using the processes described in FIGS. 6 and 7.) The data analyzer 305 provides the information determined to the transformation recommendation module 350. The transformation recommendation module 350 uses the received information to determine recommendations of transformation operations and also to rank various recommendations of transformation operations for presenting to the user.

For example, assume that the data analyzer receives selection of a set of bins of attribute A1. The data analyzer 305 determines that an attribute A2 has significant number of values that are related to the selected bins of the attribute A1 and attribute A3 has very small number of values (or no values) that are related to the selected bins of the attribute A1. Accordingly, the transformation recommendation module 350 recommends transformations based on attribute A2 instead of transformations based on A3 since the user is more likely to be interested in attribute A2 rather than A3 based on the users selection of the bins of attribute A1. Alternatively, the transformation recommendation module 350 may rank recommendations of transformations based on attribute A2 higher than recommendation of transformations based on A3 (or give them higher priority) when the recommendations of transformations are presented to the user, for example, as shown in FIG. 10.

Alternative Embodiments

Although the disclosed embodiments describe various steps as being performed by a data preprocessing system, these steps may be performed by other systems configured to analyze data and are not limited to data preprocessing systems.

It is to be understood that the figures and descriptions of the present invention have been simplified to illustrate elements that are relevant for a clear understanding of the present invention, while eliminating, for the purpose of clarity, many other elements found in a typical data preprocessing systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for analysis of a dataset, the method comprising:
   receiving information identifying a dataset, the dataset comprising a plurality of records, each record comprising values of one or more attributes;
   for each attribute of the dataset, identifying a set of bins, each bin corresponding to a subset of values of the attribute;
   for each pair of attributes comprising a first attribute and a second attribute, determining:
      for each pair of bins comprising a first bin corresponding to the first attribute and a second bin corresponding to a second attribute:
         determining a measure of frequency of occurrence for the bin pair, the measure of frequency of occurrence based on a number of records of the dataset having a value of the first attribute occurring in the first bin and a value of the second attribute occurring in the second bin, and
         storing the measure of frequency of occurrence for the pair of bins;
   sending, for presentation, a visual representation of a target attribute related to a source attribute based on a measure of frequency of occurrence of bin pairs for the source attribute and the target attribute;
   receiving, via a user interface, a selection of bins of a source attribute;
   determining for the target attribute, a histogram representing a frequency of occurrence of records of the dataset that relate the selected bins of the source attribute with bins of the target attribute, wherein determining for the target attribute the histogram comprises:
      for each bin of the target attribute, determining a sum of the measure of frequency of occurrence for each pair of bins including a selected bin of the source attribute and the bin of the target attribute;
   sending for presentation via the user interface, the histogram for the target attribute;
   sending for presentation via the user interface, one or more recommendations of transformations associated with the target attribute;
   receiving, via the user interface, a selection of transformation from the one or more recommendations of transformations; and
   storing the selection of transformation in a transformation script, the transformation script for preprocessing data for providing to a big data analysis system.

2. The method of claim 1, further comprising:
   configuring for presentation histograms for a plurality of attributes of the dataset, the histograms ranked based on statistical information describing each attribute.

3. The method of claim 2, wherein the histograms are ranked based on a frequency of mismatched values of each attribute, wherein a mismatch value fails to satisfy one or more constraints associated with the attribute, the one or more constraints specifying a valid value for the attribute.

4. The method of claim 2, wherein the histograms are ranked based on a frequency of outlier values of each attribute, wherein an outlier value is more than a threshold number of standard deviations away from a mean value of the attribute.

5. The method of claim 2, wherein the histograms are ranked based on a frequency of missing values of each attribute, wherein a missing value that is null or empty.

6. The method of claim 2, wherein the histograms are ranked based on a measure of similarity of each of the plurality of attributes with the source attribute.

7. The method of claim 6, wherein a measure of similarity of a pair of attributes is based on an aggregate value based on parameters describing statistical distribution of each attribute from the pair.

8. The method of claim 2, further comprising:
responsive to receiving the selection of the set of bins of a source attribute, ranking the histograms based on similarity of the distribution of data of the selected set of bins and the distribution of the data related to the selected set of bins for each attribute.

9. The method of claim 1, wherein records of the dataset are associated with geographical locations and each bin of a target attribute is associated with a geographical location, further comprising:
configuring for presentation a histogram for the target attribute, comprising, displaying each bin of the target attribute associated with a corresponding geographical location on a map, the bin represented as:
a first geometric shape having a first parameter based on a frequency of occurrence of values of the target attribute for the bin; and
a second geometric shape having a second parameter based on a frequency of occurrence of values of the target attribute related to the values of the selected bins of the source attribute.

10. The method of claim 9, wherein the first parameter corresponds to the size of the first geometric shape and the second parameter corresponds to the size of the second geometric shape.

11. The method of claim 9, wherein the first parameter corresponds to the size of the first geometric shape and the second parameter corresponds to a shading of the second geometric shape.

12. A computer readable non-transitory storage medium comprising stored instructions, wherein the stored instructions cause a processor to perform the steps of:
receiving information identifying a dataset, the dataset comprising a plurality of records, each record comprising values of one or more attributes;
for each attribute of the dataset, identifying a set of bins, each bin corresponding to a subset of values of the attribute;
for each pair of attributes comprising a first attribute and a second attribute, determining:
for each pair of bins comprising a first bin corresponding to the first attribute and a second bin corresponding to a second attribute:
determining a measure of frequency of occurrence for the bin pair, the measure of frequency of occurrence based on a number of records of the dataset having a value of the first attribute occurring in the first bin and a value of the second attribute occurring in the second bin, and
storing the measure of frequency of occurrence for the pair of bins; and sending, for presentation, a visual representation of a target attribute related to a source attribute based on a measure of frequency of occurrence of bin pairs for the source attribute and the target attribute;
receiving, via a user interface, a selection of bins of a source attribute;
determining for the target attribute, a histogram representing a frequency of occurrence of records of the dataset that relate the selected bins of the source attribute with bins of the target attribute, wherein determining for the target attribute the histogram comprises:
for each bin of the target attribute, determining a sum of the measure of frequency of occurrence for each pair of bins including a selected bin of the source attribute and the bin of the target attribute;
sending for presentation via the user interface, the histogram for the target attribute;
sending for presentation via the user interface, one or more recommendations of transformations associated with the target attribute;
receiving, via the user interface, a selection of transformation from the one or more recommendations of transformations; and
storing the selection of transformation in a transformation script, the transformation script for preprocessing data for providing to a big data analysis system.

13. The computer readable non-transitory storage medium of claim 12, wherein records of the dataset are associated with geographical locations and each bin of a target attribute is associated with a geographical location, wherein the stored instructions cause the processor to further perform the steps of:
configuring for presentation a histogram for the target attribute, comprising, displaying each bin of the target attribute associated with the corresponding geographical location on a map, the bin represented as:
a first geometric shape having a first parameter based on the frequency of occurrence of values of the target attribute for the bin; and
a second geometric shape having a second parameter based on the frequency of occurrence of values of the target attribute related to the values of the selected bins of the source attribute.

14. The computer readable non-transitory storage medium of claim 12, wherein the stored instructions are further for:
configuring for presentation, histograms for a plurality of attributes of the dataset, the histograms ranked based on statistical information describing each attribute.

15. The computer readable non-transitory storage medium of claim 14, wherein the histograms are ranked based on a frequency of mismatched values of each attribute, wherein a mismatch value fails to satisfy one or more constraints associated with the attribute, the one or more constraints specifying a valid value for the attribute.

16. A computer-system comprising:
a computer processor; and
a computer readable non-transitory storage medium storing instructions that cause the computer processor to perform steps for:
receiving information identifying a dataset, the dataset comprising a plurality of records, each record comprising values of one or more attributes;
for each attribute of the dataset, identifying a set of bins, each bin corresponding to a subset of values of the attribute;

for each pair of attributes comprising a first attribute and a second attribute, determining:
  for each pair of bins comprising a first bin corresponding to the first attribute and a second bin corresponding to a second attribute:
    determining a measure of frequency of occurrence for the bin pair, the measure of frequency of occurrence based on a number of records of the dataset having a value of the first attribute occurring in the first bin and a value of the second attribute occurring in the second bin, and
    storing the measure of frequency of occurrence for the pair of bins; and
sending, for presentation, a visual representation of a target attribute related to a source attribute based on a measure of frequency of occurrence of bin pairs for the source attribute and the target attribute;
receiving, via a user interface, a selection of bins of a source attribute;
determining for the target attribute, a histogram representing a frequency of occurrence of records of the dataset that relate the selected bins of the source attribute with bins of the target attribute, wherein determining for the target attribute the histogram comprises:
  for each bin of the target attribute, determining a sum of the measure of frequency of occurrence for each pair of bins including a selected bin of the source attribute and the bin of the target attribute;
sending for presentation via the user interface, the histogram for the target attribute;
sending for presentation via the user interface, one or more recommendations of transformations associated with the target attribute;
receiving, via the user interface, a selection of transformation from the one or more recommendations of transformations; and
storing the selection of transformation in a transformation script, the transformation script for preprocessing data for providing to a big data analysis system.

17. The computer-system of claim 16, wherein records of the dataset are associated with geographical locations and each bin of a target attribute is associated with a geographical location, wherein the stored instructions cause the processor to further perform the steps of:
configuring for presentation a histogram for the target attribute, comprising, displaying each bin of the target attribute associated with a corresponding geographical location on a map, the bin represented as:
  a first geometric shape having a first parameter based on the frequency of occurrence of values of the target attribute for the bin; and
  a second geometric shape having a second parameter based on the frequency of occurrence of values of the target attribute related to the values of the selected bins of the source attribute.

18. The computer-system of claim 16, wherein the stored instructions cause the processor to further perform the steps of:
configuring for presentation, histograms for a plurality of attributes of the dataset, the histograms ranked based on statistical information describing each attribute.

19. The computer-system of claim 18, wherein the histograms are ranked based on a frequency of mismatched values of each attribute, wherein a mismatch value fails to satisfy one or more constraints associated with the attribute, the one or more constraints specifying a valid value for the attribute.

* * * * *